I. VAN RIPER.
MANGERS.

No. 194,485. Patented Aug. 21, 1877.

Witnesses.
Otto Hufeland.
Chas. Wahlers.

Inventor.
Isaac Van Riper
by
Van Santvoord & Hauff
his attorneys

UNITED STATES PATENT OFFICE.

ISAAC VAN RIPER, OF LONG ISLAND CITY, NEW YORK.

IMPROVEMENT IN MANGERS.

Specification forming part of Letters Patent No. 194,485, dated August 21, 1877; application filed May 31, 1877.

*To all whom it may concern:*

Be it known that I, ISAAC VAN RIPER, of Long Island City, in the county of Queens and State of New York, have invented a new and useful Improvement in Mangers, which improvement is fully set forth in the following specification, reference being had to the accompanying drawing, in which—

Figure 1:
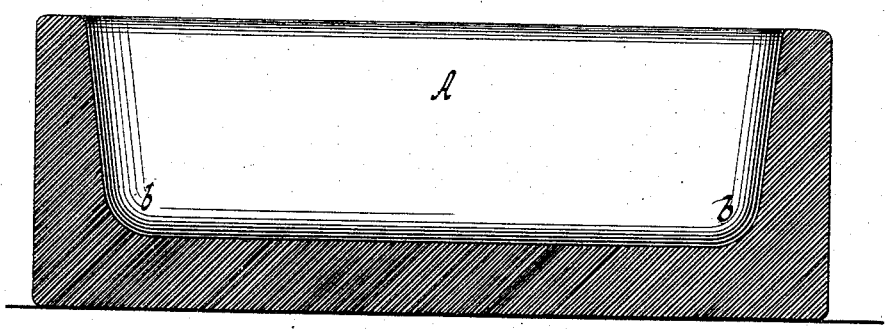
Figure 2:
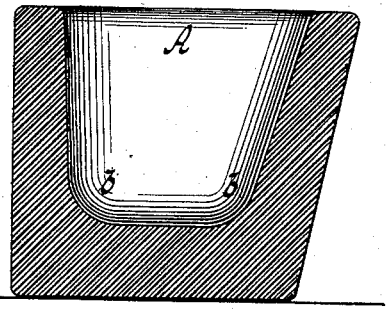

Figure 1 represents a longitudinal vertical section of my manger. Fig. 2 is a cross-section thereof.

Similar letters indicate corresponding parts.

My invention consists in a manger which is molded in one solid piece of a composition of cement and sand, and rounded at the junction of its bottom and inner sides, whereby I obtain an article which can be furnished at low cost, and is very durable, while at the same time it can be easily kept clean, and is adapted to keep any feed which may be placed therein in a pure and cool state.

In the drawing, the letter A designates a manger made according to my invention, the same being molded in one solid piece of composite material, and rounded at the junction of its bottom and inner sides, as at *b*. By rounding the corners of the manger as last stated, it does not present any angles or corners for the secretion of feed, as is the case in mangers of the old form, and hence my manger can be very easily kept clean.

In carrying out my invention, I mix together equal parts, by measure, of Portland cement and clean sharp sand, and press the same, to the form of the manger A, in molds of suitable shape, and in the usual way of making composition articles.

In some cases I add plaster-paris or charcoal, or both, to the cement and sand, in the proportion of one-sixth part, by measure, of plaster-paris or charcoal to one-third part of sand and cement, or other materials may be added to the composition.

By forming a manger of the composition named it is rendered cheap and very durable, and, moreover, is not liable to sour feed which is allowed to remain therein; and, furthermore, on account of the poor heat-conducting quality of said composition, the manger is adapted to preserve a cool state for a great length of time.

The materials hitherto most commonly used in the construction of mangers are wood and iron.

Mangers made of wood have the disadvantage that when feed is allowed to remain therein any length of time it is liable to sour; and when it is considered that in railroad-car stables and other places it is very often necessary to take the horses away from the manger before it is emptied, in order to make a trip at the regular time, this disadvantage is very significant. Mangers made of iron are obviously liable to rust.

It will be seen that these and other disadvantages are overcome by my invention.

It may be remarked that my manger can be molded with one or more partitions, so as to divide the same into two or more compartments.

If desired, outlets may be provided to draw off the water.

What I claim as new, and desire to secure by Letters Patent, is—

A manger molded in one solid piece of a composition of cement and sand, and which is rounded at the junction of its bottom and inner sides, substantially as and for the purpose described.

In testimony that I claim the foregoing I have hereunto set my hand and seal this 29th day of May, 1877.

ISAAC VAN RIPER. [L. S.]

Witnesses:
 W. HAUFF,
 E. F. KASTENHUBER.